United States Patent [19]

Cowan

[11] Patent Number: 4,913,222
[45] Date of Patent: Apr. 3, 1990

[54] AIR/AIR HEAT EXCHANGER USING WATER AS HEAT EXCHANGE MEDIUM

[76] Inventor: Ben Cowan, 46 Heath Road, Montreal, Quebec, Canada, H3X 3L4

[21] Appl. No.: 283,903

[22] Filed: Dec. 13, 1988

[30] Foreign Application Priority Data

Dec. 24, 1987 [CA] Canada .................................. 555396

[51] Int. Cl.$^4$ ............................................. F28D 19/00
[52] U.S. Cl. ......................................... 165/7; 165/8; 165/104.31; 165/111; 34/75; 34/86; 261/92
[58] Field of Search ..................... 165/111, 104.31, 6, 165/7, 8; 34/75, 86; 261/92

[56] References Cited

U.S. PATENT DOCUMENTS

| | | | |
|---|---|---|---|
| 3,804,155 | 4/1974 | Glicksman | 165/6 |
| 4,037,653 | 7/1977 | Meissner et al. | 165/111 |

FOREIGN PATENT DOCUMENTS

| | | | |
|---|---|---|---|
| 381991 | 6/1939 | Canada . | |
| 565908 | 11/1958 | Canada . | |
| 746331 | 11/1966 | Canada . | |
| 944887 | 4/1974 | Canada . | |
| 1074104 | 3/1980 | Canada . | |
| 441731 | 3/1927 | Fed. Rep. of Germany | 34/86 |
| 218807 | 7/1924 | United Kingdom | 165/8 |

*Primary Examiner*—Albert W. Davis, Jr.
*Attorney, Agent, or Firm*—Robic, Robic & Associates

[57] ABSTRACT

A heat recovery unit for use to preheat fresh air with hot air produced in an industrial process, such as the hot air exhaust from a dryer of a pulp and paper mill. The recovery unit makes use of water circulating from one air/water heat exchanger tank to another air/water heat exchanger tank as heat transfer medium. Hot air whose heat is to be recovered at least in part, flows past a set of revolving discs of metal partially immersed in the water flowing in one of the heat exchanger tanks. The portions of the discs which are exposed to the hot air above the water level transfer the heat they recover to the flowing water. The water which is so heated passes into the other heat exchanger tank where it raises the temperature of an identical set of revolving discs which in turn heats a fresh air intake to provide warm air. The main advantage of this recovery unit is that the heat recovery conditions can be easily adjusted to fit any seasonal fresh air change. Such an adjustment can be carried out by varying one or more of the following factors: (1) rotation speed of the discs; (2) flow rate of the water in the heat exchanger tanks; and (3) depth of immersion of the discs in the water in the tanks.

12 Claims, 5 Drawing Sheets

AIR/AIR HEAT EXCHANGER USING WATER AS HEAT EXCHANGE MEDIUM

BACKGROUND OF THE INVENTION (a) Field of the Invention

The present invention relates to a heat recovery unit for use in an industrial process to preheat fresh air such as cold air taken from the outside, with hot air produced in the process, such as the hot air exhaust from a dryer.

More generally, the present invention relates to an air/air heat recovery unit making use of water as heat transfer medium.

(b) Brief Description of the Prior Art

Air/air heat exchangers are well known in the art and commonly used in numerous industrial processes to preheat fresh air taken from the outside with hot air generated during the process, prior to disposing of the same.

These known heat exchangers usually comprise two adjacent compartments having at least one heat-conducting wall in common, each compartment being provided with an air inlet and an air outlet. The hot air whose heat is to be recovered, is passed through one of the compartments of the heat exchanger. The fresh air to be warmed is passed through the other compartment, either in the same direction as the hot air, in opposite direction thereto (countercurrent) or even in angled direction. Heat exchange between the hot and fresh air flows occurs by heat conduction through the conducting wall common to both compartments.

These known air/air heat exchanger are rather efficient as far as heat exchange is concerned. However, they have the major drawback of being very difficult to control as the only way of adjusting the amount of heat exchange is to vary the flow rate of fresh air and/or hot air through the compartments.

In other technical fields not directly related to heat exchange, industrial apparatuses are known, which comprise a tank having a lower liquid space and an upper gas space on top of the liquid space, a liquid inlet and a liquid outlet, a gas inlet and a gas outlet and at least two rotary driving shafts parallel to the longitudinal direction of the container, each shaft supporting a plurality of rotary discs mounted and sized in such a manner that the discs on one shaft overlap without contacting the discs of the other adjacent shaft(s) and, simultaneously, dip into the liquid in the tank.

Industrial apparatuses of this type are disclosed by way of examples, in Canadian Pat. Nos. 381,991 and 565,908, for scrubbing a gas with a liquid in such a manner as to remove the impurities contained in this gas. Another industrial apparatus of this type is disclosed, by way of example, in Canadian Pat. No. 746,331, for humidifying the air exhaust from domestic, hot air heating system. Another industrial apparatus of the same type is disclosed in Canadian Pat. No. 944,887, for reacting a liquid, namely a solution of a high molecular weight polymer, with a reactive gas. In this particular case, the apparatus acts as a gas-liquid contact reactor.

OBJECTS OF THE INVENTION

An object of the present invention is to provide a heat recovery unit to preheat fresh air with hot air available in the premises prior to disposing of the same, which unit makes use of water as heat exchange medium between the fresh and hot air.

Another object of the invention is to provide heat recovery unit of the above mentioned type, comprising two air/water exchangers connected to each other in such a manner that water is heated by hot air in one of the heat exchanger.

A further object of the invention is to provide a heat recovery unit of the above mentioned type, wherein at least one of the two air/water heat exchangers is of a structure very similar to the structure of the scrubber, humidifier and the gas-liquid contact reactor disclosed in the above mentioned Canadian Pat. Nos. 381,991; 565,908; 746,331 and 944,887.

Still another object of the invention is to provide a heat recovery unit of the above mentioned type, which unit is useful as air/air heat exchanger and wherein the heat exchange conditions may be easily varied and adjusted in a plurality of different manners, thereby making it possible to set the best operating conditions automatically for optimum heat recovery at all times.

SUMMARY OF THE INVENTION

In accordance with the invention, the objects listed hereinabove are achieved with a heat recovery unit which makes use of water circulating from one air/water heat exchanger to another air/water heat exchanger, as heat transfer medium. Hot air coming from, for example, the dryer of a pulp and paper mill or machine passes through one of the heat exchangers which comprises a set of revolving discs of metal partially immersed in water. The hot air flows past this set of revolving discs which are mounted on a plurality of parallel shaft extending perpendicularly to the air flow. The exposed portion of the revolving discs above the water are heated by the hot air flow and transfer their heat to the flowing water while the air cooled in this one heat exchanger is exhausted to the atmosphere. The water which is so heated passes through a liquid seal into the other air/water heat exchanger which may be of conventional structure or of the same structure as the one heat exchanger, to raise the temperature of a fresh air flow passing therethrough.

The water level in each of heat exchanger tanks provided with a set of revolving discs, can be easily controlled. An initial adjustment to a desired level under static conditions can be made before starting. Subsequently, a level controller can be used to admit fresh water or bleed any excess of water in the tank(s) to waste wherever necessary.

Of course, a pump must be used to return the cooled water from the outlet of the other heat exchanger, back to the inlet of the one heat exchanger provided with the revolving discs.

A flow control valve can be provided and operated by a flow meter to control the circulation rate and the velocity of water past the discs. In addition, a filter may be used on line to remove dust and fibers that may be present in the water, and thus prevent undue accumulation in the water system.

The major advantages of the above mentioned unit are the following:

(1) the closely spaced metal discs in the heat exchange tanks provide narrow air and water passages which promote good heat transfer between the wet surface and the air. On the hot air side, there is also condensation of vapor on the exposed discs for additional heat recovery. Heat transfer from discs to water and water to discs is high again because of the narrow flow passages and turbulences due to the disc rotation;

(2) since the discs are continually water washed dust and fibers contained in the hot air, especially when this hot air comes from a dryer exhaust, cannot accumulate on the heat recovery disc surfaces;

(3) the discs are accessible to inspection and cleaning through doors in the disclosure in the tanks thereby making them easy to clean with a high pressure water hose;

(4) heat recovery conditions can be easily adjusted to fit any seasonal fresh air change, by varying numerous factors including:

(a) rotational speed of the discs;
(b) rate of flow of the water;
(c) depth of immersion of the discs in the water.

More particularly, the heat recovery unit according to the invention as broadly claimed hereinafter, basically comprises:

A—a first heat exchanger comprising:
  a horizontally elongated tank partially filled with water, said tank having an air inlet at one end and an air outlet at the other end,
  at least two horizontal shafts extending transversally across the tank at substantially mid-height thereof, said shafts being parallel to each other and longitudinally spaced apart over the length of said tank at a distance which is comprised between the internal height of said heat exchanger tank and half of said height;
  a set of spaced-apart metal discs coaxially mounted onto each shaft, each of said discs extending in a vertical plane and having a diameter substantially equal or very close to the internal height of the heat exchanger tank so that at least one part of each of said discs dips into the water in the tank, said disc being positioned in such a manner that the discs of each set be respectively intercalated between the discs of every adjacent set to provide narrow air and water passages therebetween; and
  driving means for rotating the shaft together with the discs coaxially mounted thereto;

B—a second air-water heat exchanger including an air passage and a water passage;

C—means for passing hot air whose heat is to be recovered at least in part, through the tank of the first heat exchanger;

D—means for passing cold air to be heated through the air passage of the second heat exchanger; and E—means for circulating water in closed cycle from the tank of the first heat exchanger to the water passage of the second heat exchanger and vice versa,
  whereby heat is transferred from the hot air passing through the first heat exchanger to the cold air passing through the second heat exchanger via the circulating water, said circulating water acting as heat transfer medium.

BRIEF DESCRIPTION OF THE DRAWINGS:

The invention will be better understood upon reading of the following non restrictive description of several preferred embodiments thereof, given with reference to the accompanying drawings in which.

DESCRIPTION OF SEVERAL PREFERRED EMBODIMENTS

Figure 1:
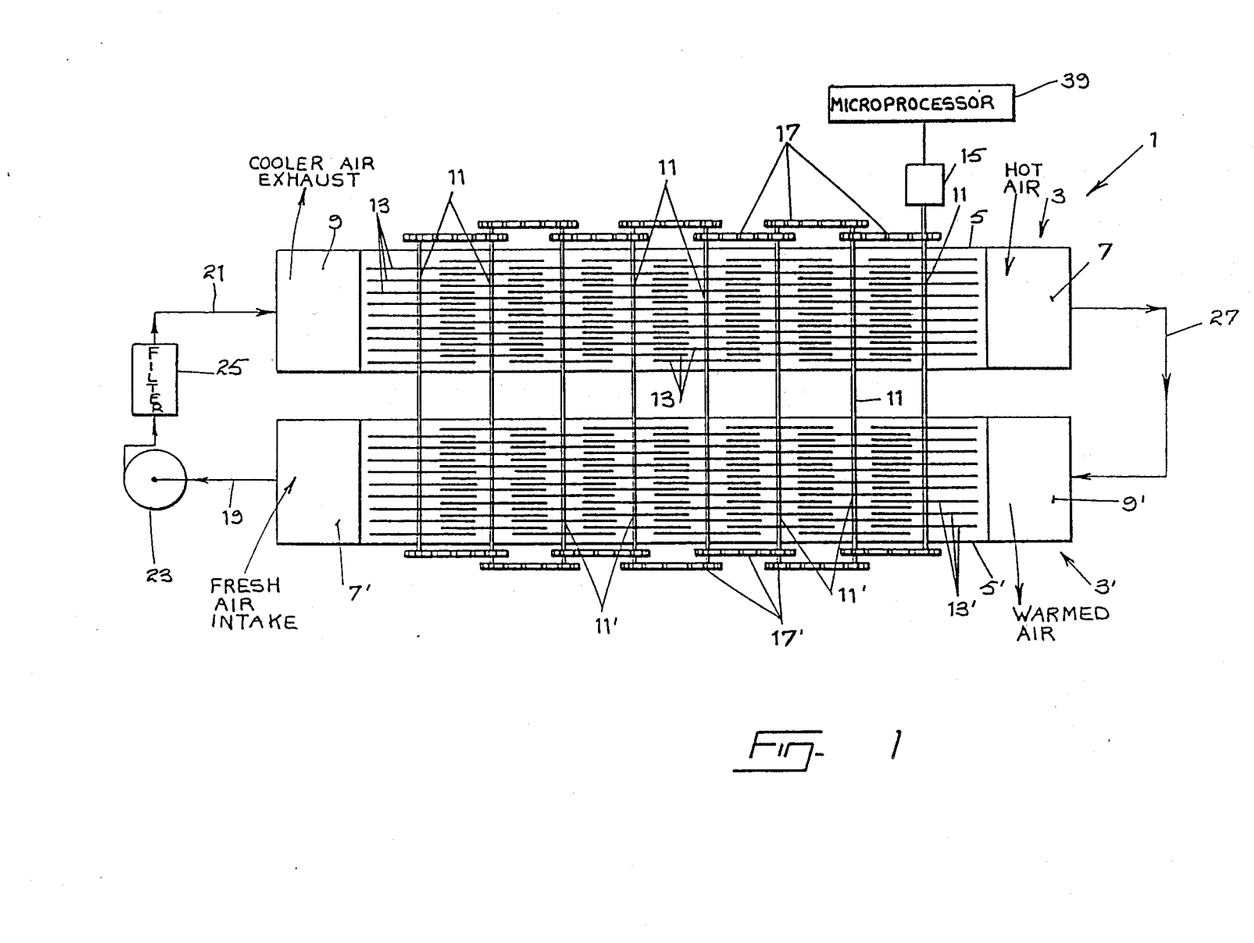
FIG. 1 is a top plan view of a heat recovery unit according to a first embodiment of the invention.
Figure 2:
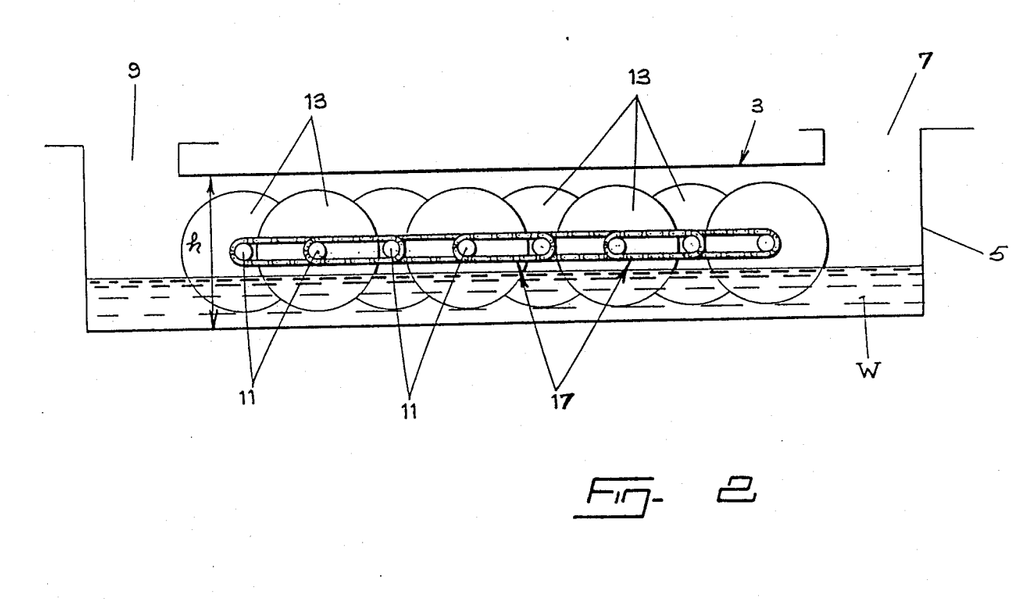
FIG. 2 is a cross-sectional, side elevational view of one of the heat exchanger of the heat recovery unit shown in FIG. 1.

The heat recovery unit 1 according to a first embodiment of the invention as shown in FIGS. 1 and 2, comprises a pair of heat exchangers 3 and 3' that are identical in structure. For this reason, only one of these heat exchangers namely the one numbered 3, will now be described in detail. However, the same reference numerals will be used with a distinguishing prime (') to identify the similar structural elements of the other heat exchanger 3'.

The heat exchanger 3 comprises an horizontally elongated tank whose bottom is partially filled with water "W". The tank 5 has an air inlet 7 at one end and an air outlet 9 at the other end. At least two but preferably four or more horizontal shafts 11 extend transversally across the tank at substantially mid-height thereof. These shafts 11 are parallel to each other and longitudinally spaced apart over the length of the tank 5 at a distance which is comprised between the internal height "h" of the tank 5 and half of this height "h".

A set of spaced-apart metal discs 13 are coaxially mounted onto each shaft 11. Each of the discs 13 extends in a vertical plane and has a diameter which is substantially equal or very close to the internal height "h" of the tank 5 so that at least one part of each of the disc 13 dips into the water "W" in the tank 5, the remaining part of the discs 13 extending over the water.

As clearly shown in FIGS. 1 and 2, the discs 13 are positioned in such a manner that the discs of each set be respectively intercalated between the discs of every adjacent set to provide narrow air and water passages therebetween.

Driving means are provided to rotate all of the shafts 11 together with the discs 13 coaxially mounted thereto. These driving means include a motor 15 connected to the end of one of the shafts 11 and a plurality of chain and sprocket assemblies 17 transmitting the rotational motion of the shaft 11 driven by the motor 15 to all of the other shafts.

As clearly shown in FIG. 1, the first and second heat exchangers 3, 3' are positioned along side to each other with the shafts 11 of the first heat exchanger 3 aligned with, an integrally connected to the shaft 11' of the second heat exchanger 3'. This particular positioning is of a great interest in that only one motor 15 can be used to drive all of the shafts 11 and 11' of the first and second heat exchangers 3 and 3'. In addition such a positioning makes it possible to get rid of one of the sets of chain and sprocket assemblies 17 and 17'.

Means (not shown) are provided for passing hot air whose heat is to be recovered at least in part, through the tank 5 of the first heat exchanger 3. The hot air may come from the exhaust of the dryer of a paper machine. It enters the tank 5 of the first heat exchanger 3 through the air inlet 7, and escapes from the same through the air outlet 9.

Means that may consist of a blower (not shown), are provided for passing fresh air to be heated through the tank 5' of the second heat exchanger 3', from the air inlet 7' to the air outlet 9'.

As shown in FIG. 1, the heat exchanger 3 and 3' are positioned head-to-foot alongside of each other, whereby the hot air and fresh air flows therethrough in opposite directions.

Means are also provided for circulating water in closed cycle from the tank 5 of the first heat exchanger 3 to the tank 5' of the second heat exchanger 3', and vice-versa. These water circulating means include a water outlet 19' at the end of the tank 5' of the second heat exchanger 3', where is located the fresh air inlet 7', and a water inlet 21 at the end of the tank 5 of the first heat exchanger 3, where is located the air outlet 9 through which the air supplied through the air inlet 7 and cooled in the tank 5 escapes out usually to atmosphere. A water pump 23 is mounted in line between the water outlet 19' of the second heat exchanger 5' and the water inlet 21 of the first heat exchanger 3. This water pump 23 has its inlet connected to the water outlet 19' and its outlet connected to the water inlet 21 to cause circulation of the water in the direction shown with arrows in FIG. 1.

Advantageously, a water filter 25 can be mounted in line downstream the pump 23. The filter 25 preferably has an automatic backwash to remove dust and fibers that may be in suspension in the flowing water and thus prevent undue accumulation in the water system.

The water circulating means further include a water connection 27 extending between the end of the tank 5 of the first heat exchanger 3 where is located the hot air inlet 7, and the end of the tank 5' of the second heat exchanger 3' where is located the air outlet 9' through which the fresh air warmed inside the second heat exchanger 3' escapes out.

As can now be understood, the air flows in the tanks 5 and 5' of the heat exchangers 3 and 3' are opposite to the water flows in the same tanks, whereby a true counterflow air/water heat exchange is achieved each of the tanks 5 and 5'.

Figure 3:
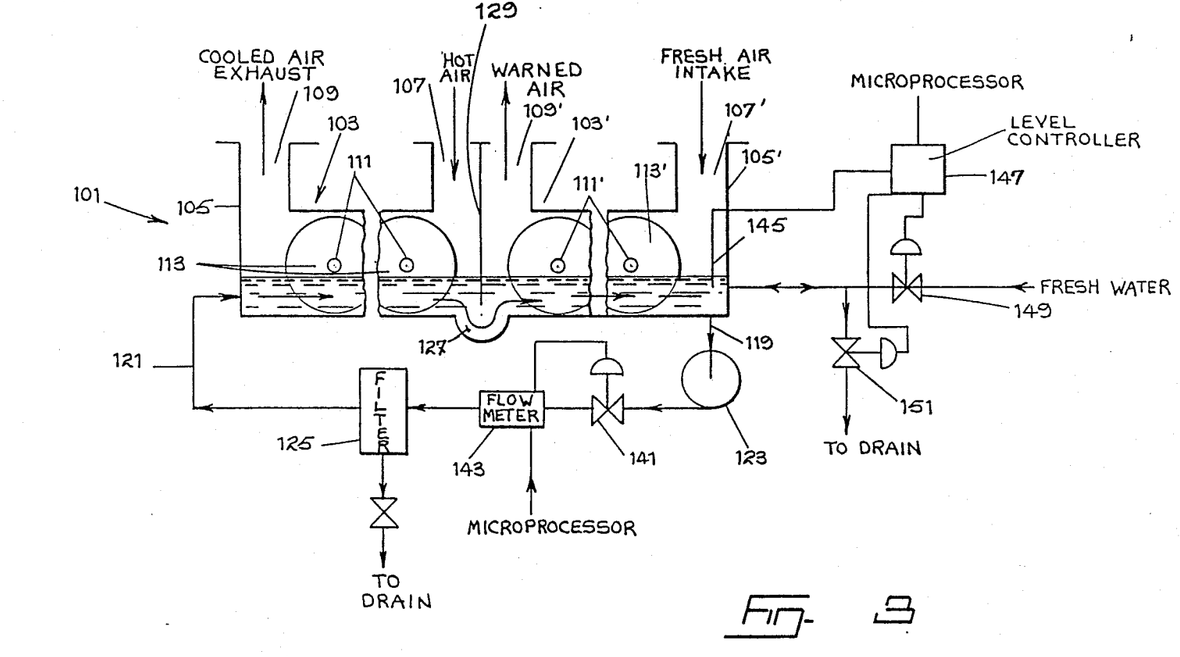
FIG. 3 is a cross-sectional, side elevational view of another heat recovery unit according to another embodiment of the invention.

The heat recovery unit 101 according to the second embodiment of the invention as shown in FIG. 3 is structurally very close to the heat recovery unit 1 shown in FIGS. 1 and 2. For this reason, the same reference numerals, plus 100, have been used in this figure to identify the same structural elements that will not be disclosed again hereinafter.

The only major difference between the heat recovery unit 101 according to this second embodiment and the unit 1 according to the first embodiment of the invention as shown in FIGS. 1 and 2, is that the tanks 105 and 105' of the first and second heat exchangers 103 and 103' are positioned end-to-end in line, instead of being positioned alongside to each other.

In this particular embodiment, the tank 105 and 105' have a common end wall 129 which opening 127 acts as a water seal between both of the heat exchangers 3 and 3'.

Figure 4:
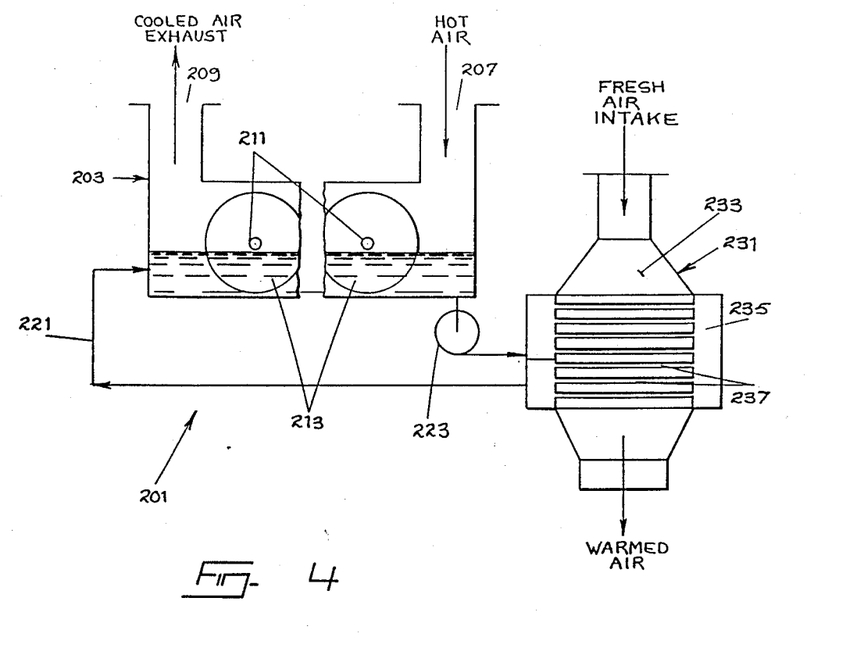
FIG. 4 is a cross-sectional, side elevational view of a further heat recovery unit according to a further embodiment of the invention.

The heat recovery unit 201 according to the third embodiment of the invention as shown in FIG. 4 is an hybrid unit that can be used when it is compulsory that the fresh air to be warmed does not pick up too much moisture from the wetted discs.

In this hybrid unit, the first air/water heat exchanger 203 is of the same structure as the heat exchangers 3 and 103 disclosed hereinabove. For this reason, the same reference numerals plus 200, have been used to identify the same structural elements.

The second air/water heat exchanger 203 is however completely different and consists of a standard, tubular heat exchanger including an air passage 233 through the fresh air to be warmed up passes, and a water passage 235 including a surrounding sleeve and a plurality of transversal tubes 237 extending across the air passages 133, through which the water heated in the first heat exchanger 203 is passed by the pump 223 which, in this particular embodiment, is connected directly to the water outlet of the first heat exchanger 203.

A plurality of control means may be provided to adjust heat recovery for seasonal or daily variations in temperature and/or humidity of the air at the inlet(s). outlet(s) or both inlet(s) and outlets of one or both heat exchanger(s) respectively. Thus, by way of example, adjustment can be carried out to take into account variation of the fresh air intake temperature, humidity, seasonal or daily variations in the volume of air supplied to either of the heat exchangers.

As shown in FIG. 1, first control means controlled by or forming part of a microprocessor 39 may be connected to the driving means of both of the first and second heat exchangers 3 and 3' for adjusting the rotation speed of the shafts 11 and 11' and discs 13 and 13' fixed thereto. In the particular case shown in FIG. 1, the first control means may simply be connected to the motor 15 to adjust the rotation speed of the same.

As shown in FIG. 3 second control means may also be connected to the water circulating means for adjusting the water flow rate through the first and second heat exchangers 103 and 103'. The second control means may comprise a flow control valve 141 operated from a flow meter 143 to control the circulation rate through the heat recovery unit 101. The flow meter 143 may itself be connected to and controlled by the same microprocessor as used to control the rotation speed of the shafts.

As also shown in FIG. 3, third control means may also be provided for adjusting the water level in the tanks 105 and 105' of both of the first and second heat exchangers 103 and 103'. Of course, the water level in the tanks depends on the volume of water in the system. In practice, the water level should be kept as low as possible to reduce the wetted disc surfaces subject to evaporation in the fresh air section, that is in the second heat exchanger 103'. An initial adjustment to a desired level on static conditions can be made prior to starting unit. The set point can be given by one or more electrodes 145 to a level controller 147 which may itself be controlled by the same microprocessor as above. If water is lost from the unit due to evaporation or leakage, the level controller 147 opens a valve 149 to admit fresh water into the tanks. If water accumulated in the unit due to condensation of the moist exhaust, the level controller 147 may open another valve 151 to bleed the extra water to waste.

Of course, these first, second and third control means can be combined and used simultaneously on any of the units 1, 101 or 201.

One can now see that, in accordance with the invention, heat recovery can be easily adjusted for seasonal and/or daily variations in the fresh and/or hot air intake temperature or humidity or, alternatively, for meeting a requested warmed air temperature, by varying anyone of the following factors:

(a) rate of water flow;

(b) rotation speed of the discs;
(c) depth of immersion of the discs in the water.

After the optimum conditions for each of these factors in relation to the incoming temperature has been determined for any given industrial process, the microprocessor 39 can be easily programmed and used to set the best operating conditions automatically for optimum heat recovery at all times.

Although condensation of the vapor that may be contained in the hot air improves the heat recovery in the hot air section of the unit, namely in the first heat exchanger, the reverse occurs in the fresh air section of the unit, i.e. in the second heat exchanger, where evaporation occurs in the fresh air flow due to exposure to the wetted discs. The amount of evaporation depends on the surface characteristics of the metal discs with regard to their water pick up, the depth for immersion of the discs and the rate of rotation of the same. For minimum evaporation, the depth of immersion of the discs in the water and the rate of rotation of the discs in the fresh air section must preferably be kept to a minimum.

Figure 5:
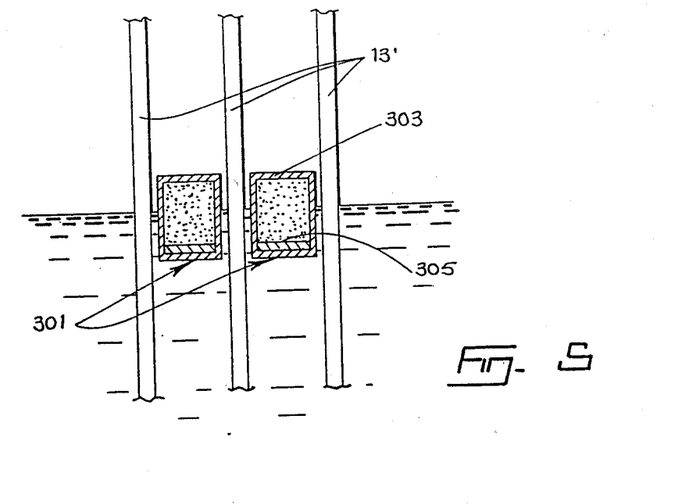
FIGS. 5 and 6 are cross-sectional, side elevational views of some adjacent discs at the water level, showing means to reduce as much as possible evaporation.
Figure 6:
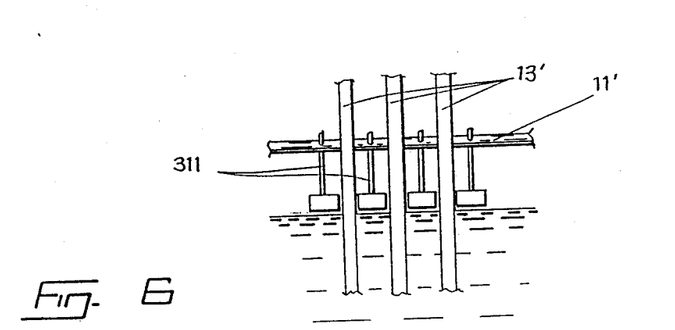

In the unlikely event that evaporation becomes a serious drawback for some applications, use can be made of the hybrid unit 201 shown in FIG. 4, where the fresh air section i.e. the second heat exchanger, consists of a standard, tubular exchanger. Alternatively, the surface of the water in the fresh air section may be masked from the fresh air passing through this section to reduce as much as possible the evaporation. Such a masking can be achieved as shown in FIG. 5, by positioning floats 301 covered with aluminum 303 and stabilized with steel weight 305 onto the water surface between each pair of discs 13' to reduce as much as possible the air-liquid contact surface. Masking may also be achieved as shown in FIG. 6, by hanging shield strips 311 onto the shafts 11' between the discs 13'. The strips 311 may be made of wood, plastic, metal foam. They may be in water or suspended above the water level, clear of the same. The strips may also consist of a large continuous flexible sheet laid over the water surface and slotted to give room to the discs 113.

It is worth mentioning however that evaporation and generation of moist warmed air may sometimes be useful. Thus, for example, a moist air generating unit may be used with great success in replacement of the standard tubular heat exchanger used up to now for the supply of warmed humidified air in industrial green houses.

The water used in the unit according to the invention may be softened so that any evaporation from the discs of the fresh air section of the unit, namely in the second heat exchanger, will not lead to too much deposit on the discs.

In all of the embodiments disclosed hereinabove, each transfer is exclusively carried out in a true counterflow manner for best temperature exchange. It should be mentioned however that the same equipment could be used with unidirectional air and water flows in each heat exchanger.

In all of the embodiments disclosed hereinabove, the spacing of the shafts and the size of the discs fixed thereto have also been selected in such a manner that the discs mounted on one shaft intermesh with the discs mounted on any adjacent shaft. It should be mentioned however that this particular selection is not essential to the invention. It is however particularly interesting in that it provides narrow air and water passages between the discs, thereby improving the heat transfer conditions.

The major advantages of each of the heat recovery units according to the invention as disclosed hereinabove are the following.

(1) A high rate of heat recovery is achieved because of the large contact surfaces between air and the metal discs, especially when these discs intermesh and provide narrow passages and turbulences to air and water, this causing good surface transfer conditions.

(2) The hot air used as heat source in the first heat exchanger may be poluted. Thus, for example, the hot air discharge from the dryer of a paper machine contains quantity of fine fibers and some volatiles from the wood. In the conventional heat exchangers used in the paper industry, which exchangers consists of banks of plates separating the hot air from the fresh air, the plates become coated with deposits which interfere with the heat transfer. Showers are used to wash these plates continually but the shower water carries away a considerable amount of heat which is not recovered in the fresh air. It is generally assumed that the warm shower water is recycled in the process and thus leads to an equivalent heat recovery. However, this is in practice misleading since the equivalent amount of heat could be recovered elsewhere from available, which heat would otherwise be wasted.

In complete contrast, the heat transfer surfaces of the discs of the heat recovery units according to the invention are continuously washed and the waste (fibers and particulates) are continuously removed by the self-cleaning filter provided in line in the water circulating system.

If desired, the tanks may be equipped with inspection doors over the discs so that these discs may be checked for condition and even hosed down for cleaning during operation if necessary. This is not possible with the conventional banks of plate heat exchangers.

(3) Contrary to the conventional heat exchangers consisting of banks of fixed plates which have no adjustable features for changes in atmospheric or operating conditions, the heat recovery units according to the invention as disclosed hereinabove can be adjusted in many ways as explained hereinabove. Once the operating characteristics of a unit have been determined for a given industrial process, the operation can be easily controlled by a microprocessor to automatically adjust to the optimal practical conditions for daily variations (day and night) and annual variations (seasonal) in the ambiant fresh air characteristics. This control may also apply to changes in the dryer performance requirements in the case of a paper machine. Such a control of course results in an improved overall recovery of waste heat.

(4) When each of the heat exchangers of the heat recovery unit operates in counterflow, a true counterflow heat exchange is achieved, as compared to the somewhat less effective crossflow occuring in the standard heat exchanger presently used in the paper industry.

(5) Last of all, since the heat recovery units according to the invention are very simple and compact, the ducting arrangements for supply and exhaust connections can be very flexible and both the location of the equipment and installation of the connections to any industrial equipment such as a paper machine dryer are easier than with any current installation.

The size, characteristics and specification of a typical unit according to the invention that could be used for recovering heat from the hot air exhaust of a standard paper mill dryer connected to a 500 tons per day newsprint machine may be as follows:

First Heat Exchanger (hot air side)

used, each to handle 2 500 lbs of hot air per minute; and

72 USCGPM of water flows through the heat exchanger tanks, the following data may be obtained.

TABLE 500 tons - 4 units
All figures given for a single unit
(suite)

|  |  |  |  |  |  |  |
|---|---|---|---|---|---|---|
| Temperature of the fresh air intake (°F.) | 70 | 50 | 30 | 10 | 0 | −20 |
| Temperature of hot air exhaust from dryer | 140 | 140 | 140 | 140 | 140 | 140 |
| Temperature of the cooled air to discharge | 105 | 95 | 85 | 75 | 70 | 60 |
| Temperature of the warmed fresh air | 105 | 95 | 85 | 75 | 70 | 60 |
| Number of discs in each heat exchanger | 310 | 310 | 310 | 310 | 310 | 310 |
| Exposed area of the discs (sq. ft) | 9,068 | 9,068 | 9,068 | 9,068 | 9,068 | 9,068 |
| Heat loss hot side BTU/hr* | 1,269,520 | 1,632,240 | 1,994,960 | 2,357,680 | 2,539,040 | 2,901,760 |
| Heat loss hot side BTU/hr** | 1,260,000 | 1,620,000 | 1,980,000 | 2,340,000 | 2,520,000 | 2,880,000 |
| Heat gain cold side BTU/hr | 1,260,000 | 1,632,240 | 1,994,960 | 2,357,680 | 2,539,040 | 2,901,960 |
| Heat gain cold side BTV/hr | 1,260,000 | 1,620,000 | 1,980,000 | 2,340,000 | 2,520,000 | 2,880,000 |
| Water flow lbs/hr | 36272 | 36272 | 36272 | 36272 | 36272 |  |
| USGPM | 72 | 72 | 72 | 72 | 72 |  |
| Disc rotation r.p.m. | 0.5 | 0.5 | 0.5 | 0.5 | 0.5 |  |

*According to a first calculation
**According to a second calculation

Overall dimensions of the tank: 33′ long×5′ wide×5.1″ high
8 shafts with 38 or 39 discs each, 60″ diameter, spaced 1.5″
Discs made of aluminum or stainless steel, approx. ⅛″ thick
Discs chain driven, variable speed drive, from 0.5 to 10 rpm.

Second Heat Exchanger (fresh air side)

Similar to the first heat exchanger

Pump

100 USGPM—15 ft head, motor 1 H.P.—to provide, for example, a 72 USGPM of water flow through the tank;
Air flow past discs: 1000 fpm approx
Water flow past discs: 0.628 fpm approx.
Provided that:
the hot air from the dryer is at the temperature of about 140° F.;
the total air flow from the dryer is of about 150 000 lbs per hour (dry air);
four heat recovery unit having the size, characteristics and specification disclosed hereinabove are

I claim:
1. A heat recovery unit comprising:
A—a first heat exchanger comprising:
  a horizontally elongated tank partially filled with water, said tank having an air inlet at one end and an air outlet at the outer end;
  at least two horizontal shafts extending transversally across the tank at substantially mid-height thereof, said shafts being parallel to each other and spaced apart over the length of said tank;
  a set of spaced-apart metal discs coaxially mounted onto each shaft, each of said discs extending in a vertical plane and having such a diameter that at least one part of said each disc dips into the water in the tank; and
  driving means for rotating the shafts together with the discs coaxially mounted thereto;
B—a second heat exchanger identical in structure to the first one;
C—means for passing hot air whose heat is to be recovered at least in part through the tank of the first heat exchanger;
D—means for passing cold air to be heated through the tank of the second heat exchanger, and

E—means for circulating water in closed cycle from the tank of the first heat exchanger to the tank of the second heat exchanger and vice-versa;

whereby heat is transferred from the hot air passing through the first heat exchanger to the cold air passing through the second heat exchanger via the circulating water, said circulating water acting as heat transfer medium.

2. The heat recovery unit of claim 1, wherein:

the shafts of both of the first and second heat exchangers are longitudinally spaced-apart at a distance which is comprised between the internal height of each of the heat exchanger tanks and half of said height;

the diameter of the discs of both of said first and second heat exchangers is substantially equal or very close to the internal height of each of said heat exchanger tanks; and the discs of each of said first and second heat exchanger are set to be respectively intercalated between the discs of every adjacent set to provide narrow air and water passages therebetween.

3. The heat recovery unit of claim 2, wherein the water circulating means comprises:

a water outlet at said one end of the tank of the second heat exchanger, where cold air is introduced;

a water inlet at said other end of the tank of the first heat exchanger, where the originally hot air now cooled escapes out;

a water pump having an inlet connected to said water outlet of the second heat exchanger and an outlet connected to said water inlet of the first heat exchanger;

a water filter mounted in series downstream the pump; and a water connection extending between said one end of the tank of the first heat exchanger and said other end of the tank of the second heat exchanger to complete the closed cycle, whereby a true counterflow air-water heat exchange is achieved in the tanks of both of said first and second heat exchangers.

4. The heat recovery unit of claim 3, wherein:

the first and second heat exchangers are positioned side-by-side with the shafts of the first heat exchanger aligned with, and integrally connected to the shafts of the second heat exchanger, and said first and second heat exchangers have the same driving means for rotating their respective shafts.

5. The heat recovery unit of claim 3, further comprising:

F—first control means connected to the driving means of both heat exchangers for adjusting the rotation speed of the shafts and discs mounted thereto.

6. The heat recovery unit of claim 3, further comprising:

G—second control means connected to the water circulating means for adjusting the water flow rate through the first and second heat exchangers.

7. The heat recovery unit of claim 3, further comprising:

H—third control means for adjusting the water level in the tanks of both of the first and second heat exchangers.

8. The heat recovery unit of claim 3, further comprising:

F—first control means connected to the driving means of both heat exchangers for adjusting the rotation speed of the shafts and discs mounted thereto;

G—second control means connected to the water circulating means for adjusting the water flow rate through the first and second heat exchangers;

H—third control means for adjusting the water level in the tanks of both of the first and second heat exchangers; and I—a microprocessor connected to each of said first, second and third control means for monitoring and adjusting the same to the optimum operating conditions for any predetermined values of the air temperatures at the air inlet, the air outlet or both of the air inlet and outlet of the first and second heat exchangers.

9. The heat recovery unit of claim 3, wherein each of said first and second heat exchanger comprises at least four shafts.

10. The last recovery unit of claim 3, for use in a paper making machine comprising at least one dryer wherein said hot air passed through said first heat exchanger is the hot exhaust air of said at least one dryer and said cold air passed through said second heat exchanger is fresh air from outdoors.

11. A hot recovery unit comprising:

A—a first heat exchanger comprising:

a horizontally elongated tank partially filled with water, said tank having an air inlet at one end and an air outlet at the other end, at least four horizontal shafts extending transversally across the tank at substantially mid-height thereof, said shafts being parallel to each other and longitudinally spaced apart over the length of said tank at a distance which is comprised between the internal height of said heat exchanger tank and half of said height;

a set of spaced-apart metal discs coaxially mounted onto each shaft, each of said discs extending in a vertical plane and having a diameter substantially equal or very close to the internal height of the heat exchanger tank so that at least one part of each of said discs dips into the water in the tank, said discs being positioned in such a manner that the discs of each set be respectively intercalated between the discs of every adjacent set to provide narrow air and water passages therebetwen; and driving means for rotating the shaft together with the discs coaxially mounted thereto;

B—a second heat exchanger identical in structure to the first one;

C—means for passing hot air whose heat is to be recovered at least in part, through the tank of the first heat exchanger;

D—means for passing cold air to be heated through the tank of the second heat exchanger; and E—means for circulating water in closed cycle from the tank of the first heat exchanger to the tank of the second heat exchanger and vise versa, whereby heat is transferred from the hot air passing through the first heat exchanger to the cold air passing through the second heat exchanger via the circulating water, said circulating water acting as a heat transfer medium, said water circulating means comprising:

a water outlet at said one end of the tank of the second heat exchanger, where cold air is introduced;

a water inlet at said other end of the tank of the first exchanger, where the originally hot air escapes out;

a water pump having an inlet connected to said water outlet of the second heat exchanger, and an outlet connected to said water inlet of the first heat exchanger;

a water filter mounted in series downstream the pump; and a water connection extending between said one end of the tank of the first heat exchanger and said other end of the tank of the second heat exchanger to complete the closed cycle, whereby a true counterflow air-water heat exchange is achieved in the tanks of both of said first and second heat exchangers;

F—first control means connected to the driving means of both of said first and second heat exchangers for adjusting the rotation speed of the shafts and discs mounted thereto;

G—second control means connected to the water circulating means for adjusting the water flow rate through the first and second heat exchangers;

H—third control means for adjusting the water level in the tanks of both of said first and second heat exchangers; and I—a microprocessor connected to each of said first, second and third control means for monitoring and adjusting the same to the optimum operating conditions for any predetermined values of the air temperatures at the inlet, the outlet and both of the inlet and outlet of the first and second heat exchangers, respectively.

12. The heat recovery unit of claim 11, wherein:
the first and second heat exchangers are positioned side-by-side with the shafts of the first heat exchanger aligned with, and integrally connected to the shafts of the second heat exchanger, and said first and second heat exchangers have the same driving means for rotating their respective shafts.

* * * * *